United States Patent

Heffner et al.

[11] Patent Number: 5,927,471
[45] Date of Patent: Jul. 27, 1999

[54] GLIDE FOR FREEZER TRANSPORT

[76] Inventors: Samuel J. Heffner, 1420 Dridge Hill Rd., Lititz, Pa. 17543; Terry L. Lindner, R.D. 2, P.O. Box 500, Ringtown, Pa. 17967

[21] Appl. No.: 08/934,917

[22] Filed: Sep. 22, 1997

[51] Int. Cl.⁶ .................................................. B65G 29/00
[52] U.S. Cl. ........................................ 198/465.1; 62/382
[58] Field of Search .................................. 62/63, 65, 374, 62/380, 382; 198/465.1

[56]  References Cited

U.S. PATENT DOCUMENTS

| 1,527,562 | 2/1925 | Kolbe | 62/374 |
| 3,141,560 | 7/1964 | Rink | 62/63 |
| 3,164,967 | 1/1965 | Marshall | 62/63 |
| 5,320,210 | 6/1994 | Van Den Bergh et al. | 198/465.1 |

FOREIGN PATENT DOCUMENTS

| 2104883 | 4/1990 | Japan | 62/378 |

*Primary Examiner*—Ronald Capossela
*Attorney, Agent, or Firm*—Martin Fruitman

[57]  ABSTRACT

The apparatus is an improvement for commercial ice cream freezing machines. Low friction glides are used to replace wheels provided to move heavily loaded, multiple level transports through the freezing machine. The glides are constructed of high density, self lubricating thermoplastic, and each glide spans the distance between and replaces two wheels. The glides are used with a groove along the bottom to match the inverted angle track of some machines and with a flat bottom for machines which use a channel track.

7 Claims, 3 Drawing Sheets

GLIDE FOR FREEZER TRANSPORT

BACKGROUND OF THE INVENTION

This invention deals generally with food processing and more specifically with apparatus for the freezing of ice cream and other products.

The typical commercial production of ice cream includes a piece of machinery which is quite impressive to those not in the ice cream processing business. The actual process of freezing the ice cream and similar products involves the use of a machine the smallest of which is approximately 15 feet high, 20 feet wide and 30 or more feet long. This entire machine is enclosed in a room which is held at a subfreezing temperature, cold enough to freeze ice cream or other frozen products, and containers filled with soft ice cream are loaded into and moved continuously though the machine so that they are frozen hard when they are later discharged from the machine.

The essential moving elements of the machine are large, multiple shelf racks, called transports in the industry, onto which many containers are loaded and which then progress through the machine as subsequent similar transports are loaded and move behind. Each of these freezer transports is typically 15 feet long, 1 to 2 feet deep, 5 to 14 feet tall, and has 4 to 14 shelves. When such a transport is fully loaded with, for example, half gallons of ice cream, its total weight can be as much as 2000 pounds. Nevertheless, the whole transport is moved through the machine, and in a low temperature environment which subjects machinery to significant problems.

The transports are constructed with a set of two wheels outriggered on each of the narrow sides. The wheels are located above the center of gravity of the transport. These wheels engage a track running along the long side of the machine so that the basic path of motion of the transports is from one end of the machine to the other. As each transport reaches the end of the machine an elevator within the machine picks it up and lifts it above the following transports which fill the entire path through which the transport has just moved.

Each transport is then moved in sequence in the opposite direction and above the initial path until it reaches the end of the machine from which it originally started. The upper return movement takes place with the transport's wheels engaging the same type of track as is built onto the lower path. At the entry end of the machine each transport is individually moved onto another elevator which lowers it to the lower level. It is during the lowering of the transports that the loading and unloading occurs using loading and discharge conveyors which pass through the machine in the region of the machine between the upper and lower levels of the moving transports.

The loading and unloading takes place as a transport is lowered in steps equal to the spacing between the shelves on the transports. As the lowest shelf moves to and stops at the level of the discharge conveyor, an unloading arm which is essentially the same size as the length of the shelf moves over the shelf from front to back and pushes all the containers with frozen product from the shelf onto the discharge conveyor which is located immediately behind the shelf. After the unloading arm retracts, the transport is then moved down the distance of one shelf height, and a loading arm, which is synchronized with the unloading arm, pushes new containers with soft product from the loading conveyor in front of the shelf onto the shelf. At the same time the lowest shelf is being loaded, the unloading arm is unloading the next higher shelf. This simultaneous loading and unloading of the shelves continues until the entire transport is loaded with new, soft, product, and the transport then again begins its travel through the machine.

As can be appreciated from the above description of the machine's operation, it is always essentially full of product, and even the smallest of such machines have 24 transports with 4 shelves and hold a total of approximately 10,000 half gallon containers. Under such conditions it is quite clear that a breakdown on such a machine presents very difficult problems. Particularly, a breakdown of such a machine which is caused by a transport jamming and not moving forward can mean the need to manually unload a substantial part of the product from the machine, and to do so in a subfreezing environment, just to get at the jammed transport. Yet, such breakdowns are not uncommon.

The major reason for the failure of a transport to move as it is pulled along by chains is the failure of one of the wheel bearings. Furthermore, with a total of approximately 100 wheels on all the transports in even a small machine, it appears that statistically one of those wheels will always be due for a failure. This is certainly true when the subfreezing environment of operation is considered, since such conditions are so detrimental to the wheel lubrication, and particularly when, for purposes of energy conservation, the transports are kept at the subfreezing temperatures and operated continuously until a wheel bearing fails.

SUMMARY OF THE INVENTION

It is the problem of wheel bearing failure that the present invention overcomes, and it does so in a surprising way. It completely eliminates the wheels and the wheel bearings by replacing each pair of wheels on one side of a transport with a single solid block glide of low friction thermoplastic.

The thermoplastic glide is mounted to replace the wheels by using two holes in the glide through which the axles for the replaced wheels are installed, and the ends of the glide are rounded or chamfered to prevent them catching on any irregularities on the track. The length of the glide is selected to essentially occupy the space of the two wheels it replaces and to fill in the distance which was between the wheels.

The only other machining of the glide is for grooves cut in the top and bottom surfaces of one embodiment of the invention. Such grooves extend the length of the top and bottom surfaces, and their cross sections match the cross section of a groove formed in the circumference of the previously used wheels. For the wheels, the grooves in the rolling surface where used to match a central raised portion of the track installed on the machine, so that the wheels always remained centered on the track. When the glides of the invention are used to directly replace wheels in an existing machine, similar grooves are then required on the glides of the invention. Although only the bottom surface of a glide is actually in use and in contact with the track, grooves are also typically formed in the top surface of the glide because the useful life of the symmetrical glide can then be doubled by simply turning the glide over to use the top surface to replace a worn bottom surface.

However, if the invention is installed in a machine specifically built to accommodate the glides, an even simpler embodiment of the glide, without the grooves, is used. For a new machine using glides without grooves on their top and bottom surfaces, a different, much simpler track is installed in the machine. In such a case, all that is required for the track is a simple standard channel. The glide then fits and slides within the channel, and the sides of the channel, acting on the low friction sides of the glide, keep the glides and the transports in alignment.

Beyond the advantage of having no rotating parts and therefore no failure prone bearings, a significant advantage of the invention is the absence of any requirement for routine maintenance. No lubrication of bearings is required, and furthermore the sliding surfaces of the glides and the mating surfaces of the tracks are constantly lubricated because of the self lubricating properties of the glide material. In fact, the force required to move the transports through the machine actually is reduced as the glides of a new installation lubricate the tracks.

The present invention thereby eliminates what is perhaps the most significant operational problem in high production freezing machines, and does so in a manner that not only permits the construction of new trouble free machines, but also permits retrofits of existing machines to eliminate a severe maintenance problem.

DETAILED DESCRIPTION OF THE INVENTION

Figure 1:
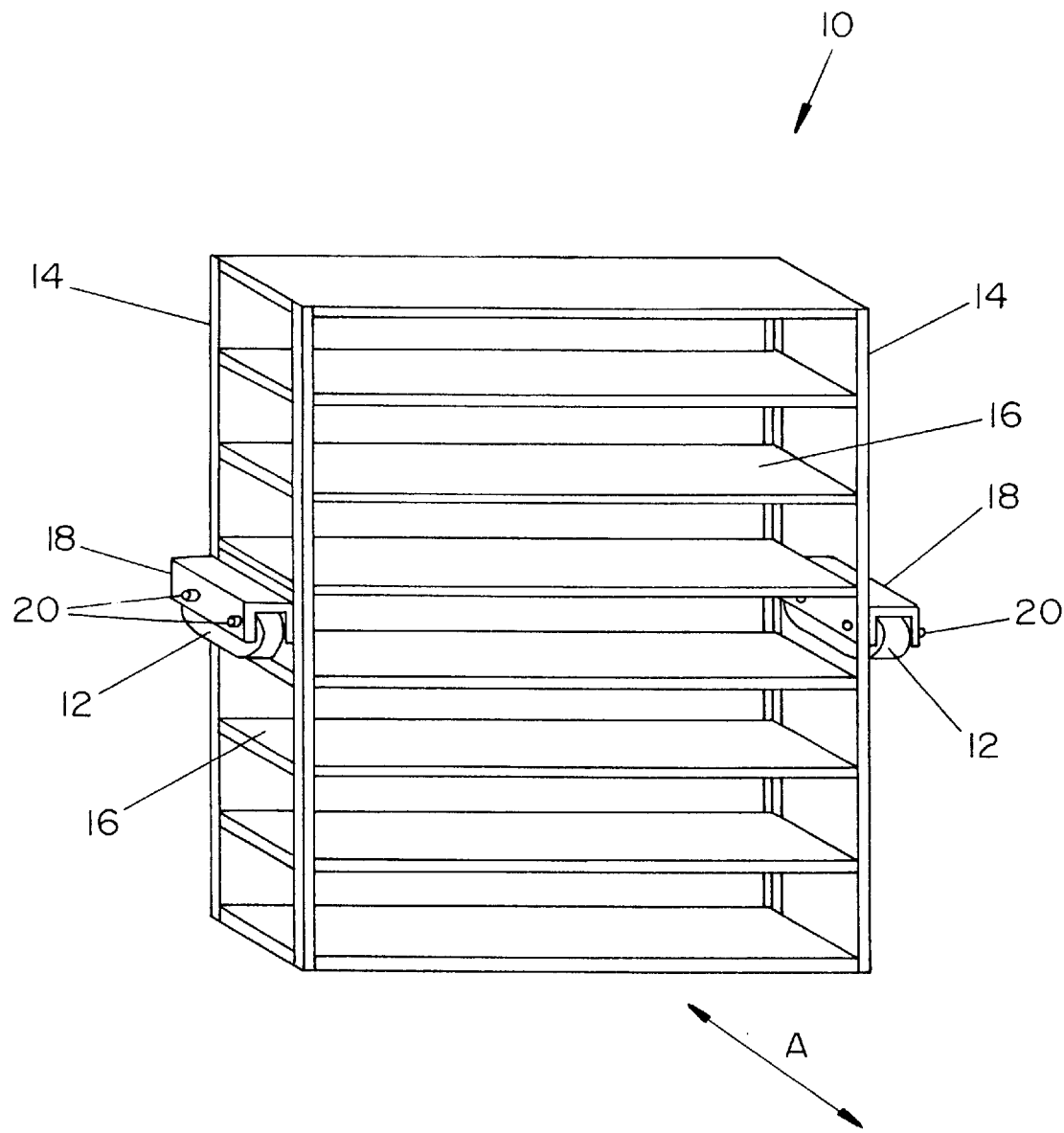
FIG. 1 is a perspective view of a typical freezer transport upon which the preferred embodiment of the invention is installed.

FIG. 1 is a perspective view of typical freezer transport 10 upon which the preferred embodiment of the invention, glides 12, are installed. As is apparent from the orientation in which glides 12 are attached to transport 10, the motion of transport 10 in the freezing machine in which it is installed is in the direction indicated by arrow A. Rack 10 is constructed of steel structural elements which form corner supports 14, shelves 16, and wheel supports 18, but the actual construction of transport 10 is not a part of this invention. Prior art freezer transports also have two steel wheels (not shown) located within each wheel support 18, and the wheels are supported by axles 20. Such wheels rest and roll upon tracks (not shown) which are located within the freezing machine.

The present invention replaces each pair of such wheels with a single glide 12 as shown in FIG. 1. Skid 12, which is a very simple structure, is shown in FIG. 2 without wheel support 18.

Figure 2:
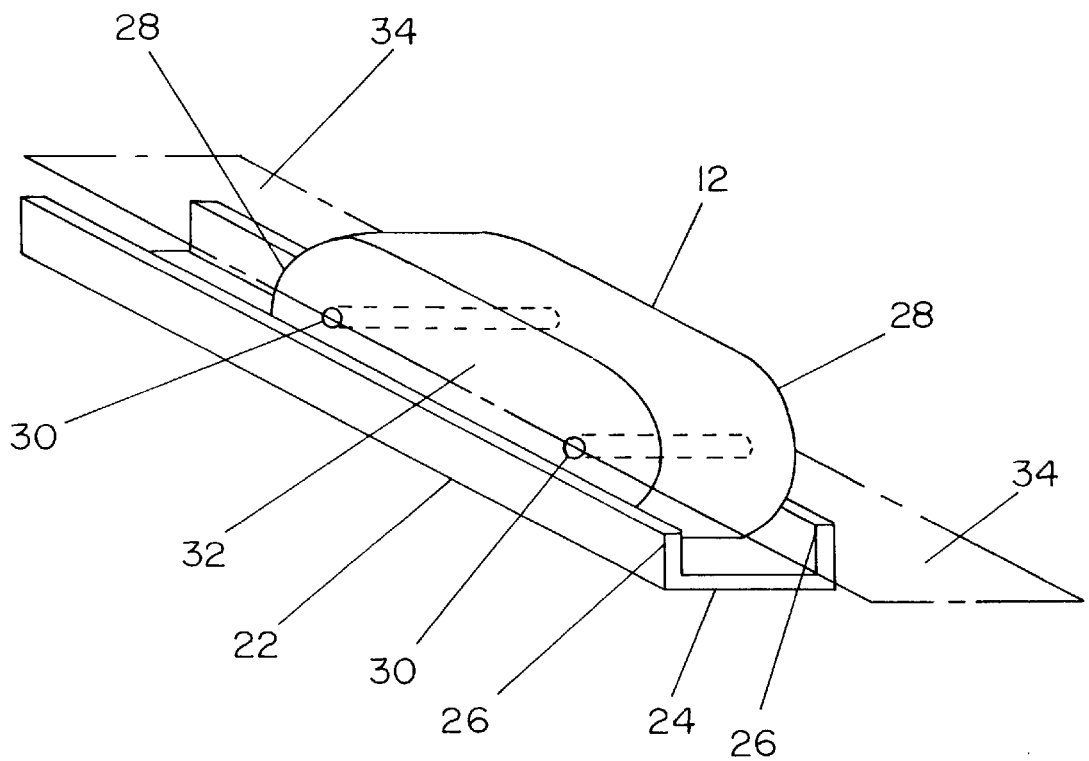
FIG. 2 is a perspective view of the preferred embodiment of the invention.

FIG. 2 is a perspective view of the preferred embodiment of glide 12 as it is positioned within track 22. Track 22 is a simple channel installed with its web 24 below its open side, so that glide 12 can move within the enclosure formed by web 24 and sides 26. Skid 12 is a simple block of low friction thermoplastic with its ends 28 rounded and two through holes 30 formed within it to span between its vertical sides 32.

The dimensions of glide 12 are largely determined by the machine within which it is installed. For instance, since when in use, transports 10 are only separated from each other by about one inch, the length of glide 12 is essentially limited by the depth of shelves 16 of transport 10. The length of glide 12 then essentially also determines the maximum spacing between axles 20, but particularly when glides are used to replace the wheels on an existing transport, the locations of holes 30 are usually determined by design considerations for the transport itself. The basic goal for the dimensions of glide 12 is to make the glide as long and as wide as possible within the limits set by the machine parameters in order to spread the load over as great a surface area as possible.

As previously noted, it is desirable to construct glide 12 so that it is symmetrical across horizontal center plane 34 so that it can be used upside down to extend its useful life.

Although other similar materials are available, the material used for glide 12 in the preferred embodiment is TIVAR 1000, sold by Solidur Pacific Co. This material is known in the thermoplastic industry as a UHMW-PE, and has a very low coefficient of friction. It has also been accepted for use in food processing equipment.

Figure 3:
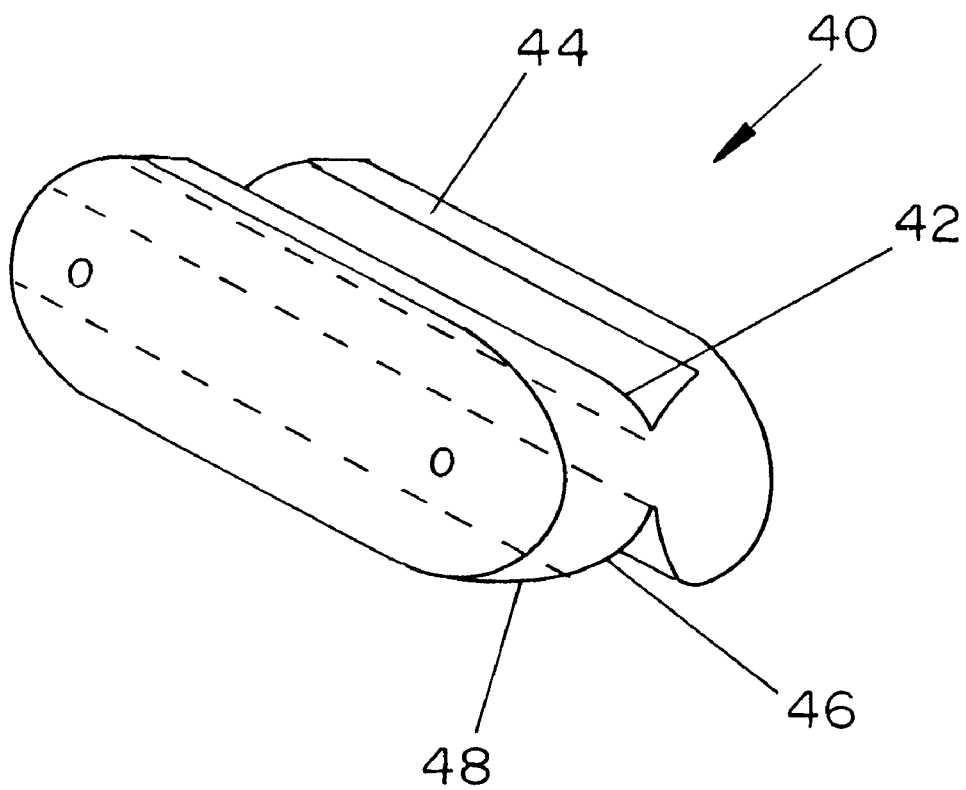
FIG. 3 is a perspective view of an alternate embodiment of the invention.

FIG. 3 is a perspective view of an alternate embodiment of the invention. Skid 40 is constructed specifically to mate with the tracks in many existing machines which are used with wheels which have a "V" groove on their rolling surface. Skid 40 is the same as glide 12 of FIG. 2 in all respects except for the presence of "V" groove 42 along its upper surface 44 and "V" groove 46 along its lower surface 48. Such "V" grooves are used when the existing track (not shown) includes an inverted angle which was used to maintain the original wheels on the track. Clearly, other groove configurations can be formed in glide 40 when the mating tracks have different profiles.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other types of thermoplastics can be used for the material of glide 12, and additional holes 30 and axles 20 can be used to reduce the loading at the stress points.

What is claimed as new and for which Letters Patent of the United States are desired to be secured is:

1. In a transport which can be moved along tracks, the improvement comprising, at least two glides each of which has a surface which contacts a track, with the glides connected to the transport and extending from the transport sides, so that the glides support the transport and can slide along the tracks to permit motion of the transport.

2. The improved transport of claim 1 wherein the glides are constructed of thermoplastic.

3. The improved transport of claim 1 wherein the glides include grooves formed in the glide surface which contacts the track, and the grooves mate with features on the tracks.

4. The improved transport of claim 1 wherein the glides are connected to the transport by connection fixtures which extend from the sides of the transport.

5. The improved transport of claim 1 wherein the connection fixtures are axles which extend from two sides of the transport and the glides each include at least two holes into which axles are inserted.

6. The improved transport of claim 1 wherein the glides have rounded ends.

7. The improved transport of claim 1 wherein the glides are constructed to be symmetrical across their center horizontal planes.

* * * * *